United States Patent
Kao

(10) Patent No.: US 12,026,519 B2
(45) Date of Patent: Jul. 2, 2024

(54) CONTROL METHOD AND DEVICE FOR POWERING TIMING

(71) Applicants: GIGA-BYTE TECHNOLOGY CO., LTD., New Taipei (TW); GIGAIPC CO., LTD., New Taipei (TW)

(72) Inventor: Chin Jun Kao, New Taipei (TW)

(73) Assignees: GIGA-BYTE TECHNOLOGY CO., LTD., New Taipei (TW); GIGAIPC CO., LTD., New Taipei (TW)

( * ) Notice: Subject to any disclaimer, the term of this patent is extended or adjusted under 35 U.S.C. 154(b) by 87 days.

(21) Appl. No.: 18/070,320

(22) Filed: Nov. 28, 2022

(65) Prior Publication Data

US 2023/0205546 A1    Jun. 29, 2023

(51) Int. Cl.
| | |
|---|---|
| *G06F 9/00* | (2018.01) |
| *G06F 1/28* | (2006.01) |
| *G06F 9/4401* | (2018.01) |
| *G06F 15/177* | (2006.01) |

(52) U.S. Cl.
CPC .............. *G06F 9/4403* (2013.01); *G06F 1/28* (2013.01)

(58) Field of Classification Search
CPC .................................. G06F 9/4403; G06F 1/28
See application file for complete search history.

(56) References Cited

U.S. PATENT DOCUMENTS

| | | | | |
|---|---|---|---|---|
| 5,905,206 A | * | 5/1999 | Herwig | ..................... G01F 1/60 |
| | | | | 73/861.12 |
| 11,064,588 B1 | * | 7/2021 | Xiong | .................. H05B 45/382 |
| 2006/0143482 A1 | * | 6/2006 | LaChapelle | ............. G06F 1/263 |
| | | | | 713/300 |
| 2010/0244912 A1 | | 9/2010 | Chen et al. | |

(Continued)

FOREIGN PATENT DOCUMENTS

| | | |
|---|---|---|
| CN | 103888270 A | 6/2014 |
| CN | 104571442 A | 4/2015 |

(Continued)

OTHER PUBLICATIONS

TW Office Action in application No. 110149261 dated Sep. 6, 2022.

*Primary Examiner* — Mohammed H Rehman
(74) *Attorney, Agent, or Firm* — Maschoff Brennan

(57) ABSTRACT

A control method for powering timing, performed by a controller, includes: performing a delay modulation procedure when triggered by a delay modulation command, wherein the delay modulation procedure includes: after a delay duration has passed, determining whether a number of output voltage values of a number of voltage converters reach a number of target levels respectively, wherein the target levels correspond to the output voltage values respectively. The method further includes: if any one of the output voltage values does not reach a corresponding one of the target levels, increasing the delay duration according to a first default interval and updating the delay duration, and performing the delay modulation procedure when triggered (Continued)

by the delay modulation command again; and if the output voltage values reach the target levels respectively, outputting a power good signal to a central processing unit, for the central processing unit to perform a booting procedure.

10 Claims, 3 Drawing Sheets

(56) References Cited

U.S. PATENT DOCUMENTS

| | | | | |
|---|---|---|---|---|
| 2011/0221417 | A1* | 9/2011 | Ishidoh | H03F 3/195 |
| | | | | 323/288 |
| 2016/0091909 | A1* | 3/2016 | Olejarz | G05F 1/56 |
| | | | | 323/280 |
| 2020/0153429 | A1* | 5/2020 | Butenhoff | H03K 17/166 |
| 2020/0307187 | A1* | 10/2020 | Nitta | B41J 2/04595 |
| 2022/0093185 | A1* | 3/2022 | Dome | G11C 29/022 |

FOREIGN PATENT DOCUMENTS

| | | |
|---|---|---|
| TW | 200918906 A | 5/2009 |
| TW | 201036328 A | 10/2010 |
| TW | M401159 U | 4/2011 |
| TW | 201321947 A | 6/2013 |
| TW | 201604679 A | 2/2016 |

* cited by examiner

CONTROL METHOD AND DEVICE FOR POWERING TIMING

CROSS-REFERENCE TO RELATED APPLICATIONS

This non-provisional application claims priority under 35 U.S.C. § 119(a) on Patent Application No(s). 110149261 filed in Republic of China (ROC) on Dec. 29, 2021, the entire contents of which are hereby incorporated by reference.

BACKGROUND

1. Technical Field

This disclosure relates to a control method and device for powering timing.

2. Related Art

The computer booting sequence is an important mechanism in circuit design, which determines the computer's boot timing. However, the computer may fail to boot due to unstable power supply, and the user may need to try to boot the computer for several times before successfully booting.

In addition, in the prior art, a power supply voltage monitoring (VCC monitor) device is often used to monitor the power state of the voltage converter in the computer. When power is input to the voltage converter, the metal-oxide-semiconductor field-effect transistor (MOSFET) or other switching components in the power supply voltage monitoring device are turned on, and the power supply voltage monitoring device sends a power good signal (PG) to the central processing unit for the booting procedure. However, the power supply voltage monitoring device sends a good power signal when it is determined that the voltage converter is powered on. At this time, the voltage of the voltage converter may not be stable, resulting in failure of the computer booting. In addition, after the booting fails, the user can only assume that there may be a problem with the voltage converter, and the computer can be successfully booted only after replacing the voltage converter.

SUMMARY

Accordingly, this disclosure provides a control method and device for powering timing.

According to one or more embodiment of this disclosure, a control method for powering timing, performed by a controller, includes: performing a delay modulation procedure when triggered by a delay modulation command, wherein the delay modulation procedure includes: after a delay duration has passed, determining whether a number of output voltage values of a number of voltage converters reach a number of target levels respectively, wherein the target levels correspond to the output voltage values respectively; if any one of the output voltage values does not reach a corresponding one of the target levels, increasing the delay duration according to a first default interval and updating the delay duration, and performing the delay modulation procedure when triggered by the delay modulation command again; and if the output voltage values reach the target levels respectively, outputting a power good signal to a central processing unit, for the central processing unit to perform a booting procedure.

According to one or more embodiment of this disclosure, a control device for powering timing includes: a central processing unit electrically connected to a number of voltage converters, with the central processing unit configured to perform a booting procedure when receiving a power good signal; and a controller electrically connected to the central processing unit and the voltage converters. The controller is configured to perform: a delay modulation procedure when triggered by a delay modulation command, and the delay modulation procedure comprising: after a delay duration has passed, determining whether a number of output voltage values of the voltage converters reach a number of target levels respectively, wherein the target levels correspond to the output voltage values respectively; if any one of the output voltage values does not reach a corresponding one of the target levels, increasing the delay duration according to a first default interval and updating the delay duration, and performing the delay modulation procedure when triggered by the delay modulation command again; and if the output voltage values reach the target levels respectively, outputting the power good signal to the central processing unit.

In view of the above description, the control method and device for powering timing according to one or more embodiments of the present disclosure may allow a computer to boot and operate normally without replacing the component by adjusting the delay duration even if one of the component in the computer deteriorates and requires longer delay duration. In addition, the control method and device for powering timing according to one or more embodiments of the present disclosure may be used to make sure that the output voltage value of each voltage converter to reach the target level, and the booting procedure is performed when the output voltage value of each voltage converter reaches the target level.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
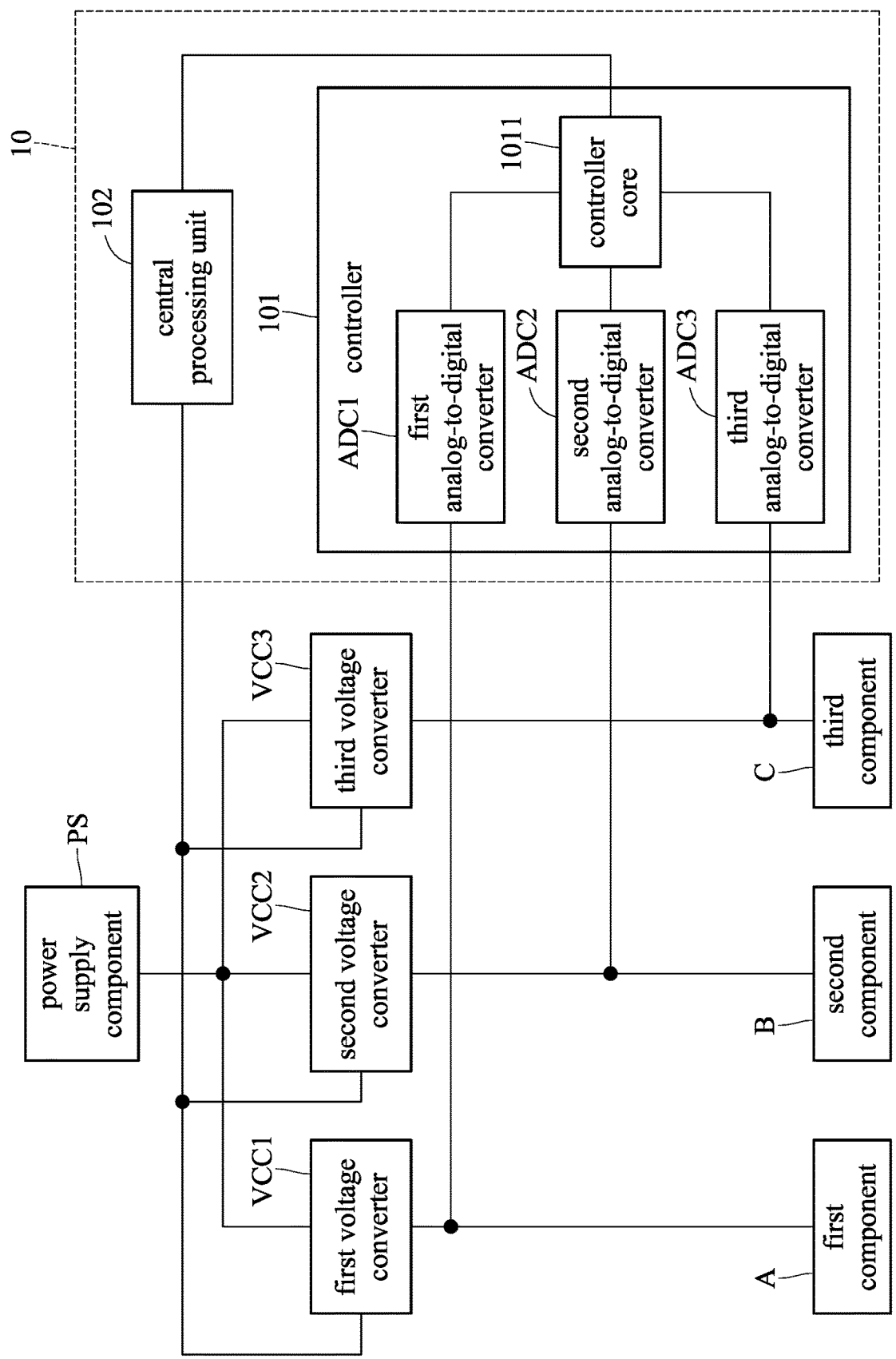
FIG. 1 is a schematic diagram illustrating connection relationships between control device for powering timing and voltage converts according to an embodiment of the present disclosure.

Please refer to FIG. 1, wherein FIG. 1 is a schematic diagram illustrating connection relationships between control device for powering timing and voltage converts according to an embodiment of the present disclosure. FIG. 1 shows a control device 10 for powering timing of the present disclosure. The control device 10 for powering timing is electrically connected to a first voltage converter VCC1, a second voltage converter VCC2 and a third voltage converter VCC3. The first voltage converter VCC1, the second voltage converter VCC2 and the third voltage converter VCC3 are further electrically connected to a power supply component PS, and are electrically connected to a first component A, a second component B and a third component C, respectively. The first voltage converter VCC1, the second voltage converter VCC2 and the third voltage converter VCC3 receive power from the power supply component PS, and are configured to output power to the first component A, the second component B and the third component C, respectively. The first component A, the second component B and the third component C may be electronic components on a computer motherboard, such as a memory, a network chip, a southbridge and a northbridge etc., the present disclosure does not limit the types of the first component A, the second component B and the third component C.

Further, the control device 10 of the present disclosure includes a controller 101 and a central processing unit 102 connected to each other, wherein the controller 101 and the central processing unit 102 may be connected to each other through transmission interfaces such as I2C or system management bus (SMBus), the present disclosure does not limit the connection method between the controller 101 and the central processing unit 102. The controller 101 may be a micro-controller (MCU), and the controller 101 includes a controller core 1011 (MCU core) and a first analog-to-digital converter ADC1, a second analog-to-digital converter ADC2 and a third analog-to-digital converter ADC3 electrically connected to the controller core 1011. The controller 101 pre-stores a delay duration, and the delay duration is a time interval from the controller 101 triggered by a delay duration modulation command (for example, a power-on signal) to outputting a power good (PG) signal.

The first analog-to-digital converter ADC1, the second analog-to-digital converter ADC2 and the third analog-to-digital converter ADC3 are electrically connected to the first voltage converter VCC1, the second voltage converter VCC2 and the third voltage converter VCC3 respectively, wherein the first analog-to-digital converter ADC1, the second analog-to-digital converter ADC2 and the third analog-to-digital converter ADC3 are selectively disposed. The central processing unit 102 and the electronic components on the motherboard may be electrically connected to the first voltage converter VCC1, the second voltage converter VCC2 or the third voltage converter VCC3 to receive a stand-by voltage.

After the power-on button is pushed by the user, the power supply component PS outputs the stand-by voltage to the first voltage converter VCC1, the second voltage converter VCC2 and the third voltage converter VCC3, and the first voltage converter VCC1, the second voltage converter VCC2 and the third voltage converter VCC3 then outputs power to the central processing unit 102, the first component A, the second component B and the third component C. The controller 101 may monitor power state of the first voltage converter VCC1, the second voltage converter VCC2 and the third voltage converter VCC3, to drive the central processing unit 102 to perform a booting procedure or to drive the central processing unit 102 to adjust the delay duration pre-stored by the central processing unit 102. The details are described below.

The first voltage converter VCC1, the second voltage converter VCC2 and the third voltage converter VCC3 may be voltage converters disposed in an industrial computer (IPC) or a laptop, and the control device 10 for powering timing may be used to monitor the power state of the voltage converters VCC1 to VCC3 in said IPC or laptop, to perform the booting procedure after confirming that the power supply is stable.

Figure 2:
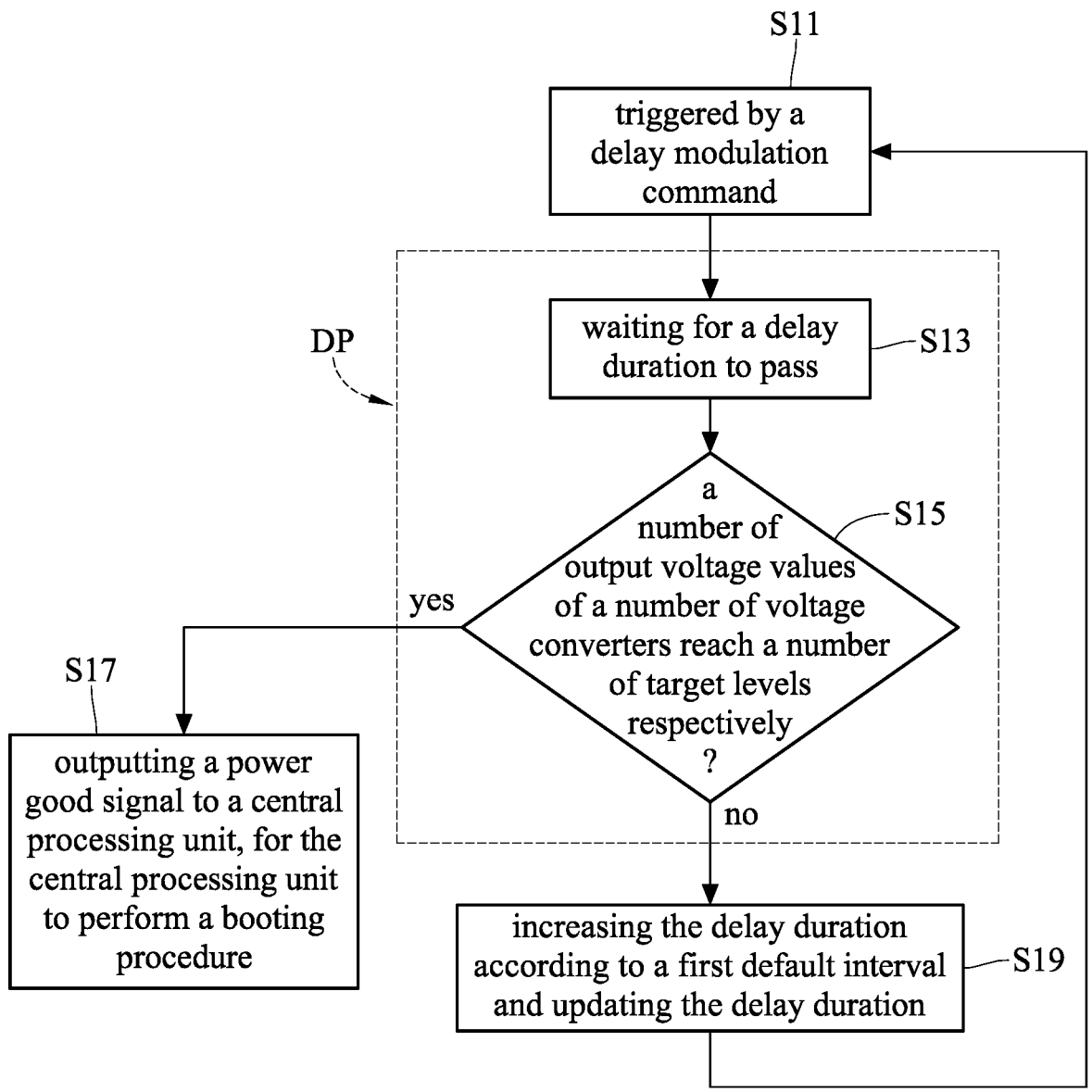
FIG. 2 is a flowchart illustrating control method for powering timing according to an embodiment of the present disclosure.

To explain the control method and control device 10 for powering timing in more detail, please refer to FIG. 1 and FIG. 2, wherein FIG. 2 is a flowchart illustrating control method for powering timing according to an embodiment of the present disclosure.

In step S11, the controller 101 of the control device 10 is triggered by the delay duration modulation command to perform a delay modulation procedure DP, wherein the delay duration modulation command may be a power-on signal.

The delay modulation procedure DP includes step S13 and step S15. In step S13 and step S15, the controller 101 of the control device 10 waits until the first voltage converter VCC1, the second voltage converter VCC2 and the third voltage converter VCC3 are activated for a delay duration, the first analog-to-digital converter ADC1, the second analog-to-digital converter ADC2 and the third analog-to-digital converter ADC3 of the controller 101 may convert a number of analog voltages outputted by the first voltage converter VCC1, the second voltage converter VCC2 and the third voltage converter VCC3 into a number of digital voltages respectively. The controller core 1011 of the controller 101 obtains values of the output voltages after analog-to-digital conversion, and determines whether the output voltage values reach a number of target levels respectively.

Specifically, each of the first voltage converter VCC1, the second voltage converter VCC2 and the third voltage converter VCC3 has a corresponding rated voltage (target level), and after the first voltage converter VCC1, the second voltage converter VCC2 and the third voltage converter VCC3 are activated, the controller 101 of the control device 10 may need to wait for a period of time (the delay duration) for the output voltage values of the first voltage converter VCC1, the second voltage converter VCC2 and the third voltage converter VCC3 to reach their corresponding target levels. Therefore, in step S13, the controller core 1011 may first wait until the delay duration has passed, and then in step S15, the first analog-to-digital converter ADC1, the second analog-to-digital converter ADC2 and the third analog-to-digital converter ADC3 convert the analog voltages of the first voltage converter VCC1, the second voltage converter VCC2 and the third voltage converter VCC3 into the output voltage values in digital form. Then, the controller core 1011 of the controller 101 determines whether the output voltage values of the first voltage converter VCC1, the second voltage converter VCC2 and the third voltage converter VCC3 reach their corresponding target levels.

If the first voltage converter VCC1, the second voltage converter VCC2 and the third voltage converter VCC3 all reach their corresponding target levels after the delay duration, it means that the delay duration is enough. Therefore, in step S17, the controller core 1011 may output the power good signal to the central processing unit 102, for the central processing unit 102 to perform the booting procedure.

If any one of the output voltage values of the first voltage converter VCC1, the second voltage converter VCC2 and the third voltage converter VCC3 does not reach the corresponding target level after the delay duration has passed, it means that the delay duration might be too short. Therefore, if the controller 101 determines that any one of the output voltage values of the first voltage converter VCC1, the second voltage converter VCC2 and the third voltage converter VCC3 does not reach the corresponding target level after the delay duration has passed, the controller 101 performs step S19. In step S19, the controller 101 increases the delay duration according to a first default interval, and updates the delay duration stored in the controller 101 with the increased delay duration. In addition, the controller 101 may record the delay duration of any one the output voltage values not reaching the corresponding target level, and increase the recorded delay duration according to the first default interval. Then, if the controller 101 is triggered by the delay duration modulation command (for example, the power-on signal) again, the controller 101 may perform the delay modulation procedure DP again. The first default interval is, for example, 20 milliseconds, the present disclosure does not limit the actual value of the first default interval. For example, the pre-stored delay duration is 210 milliseconds, and if the first voltage converter VCC1 does not reach the target level after 210 milliseconds (the delay duration) has passed, then in step S19, the controller 101 may increase the delay duration with 20 milliseconds (the first default interval) to 230 milliseconds, and update the delay duration stored in the controller 101.

Or, the controller 101 may receive a numerical value of the delay duration inputted by a user through the basic input/output system (BIOS) interface, to adjust the delay duration into a user expected duration, and store the adjusted delay duration.

In an embodiment, if the first voltage converter VCC1, the second voltage converter VCC2 and the third voltage converter VCC3 all reach their corresponding target levels after the delay duration has passed, it means that the delay duration does not cause booting failure. Therefore, the controller 101 may maintain the original delay duration and not adjusting the delay duration.

In another embodiment, if the first voltage converter VCC1, the second voltage converter VCC2 and the third voltage converter VCC3 all reach their corresponding target levels after the delay duration has passed, the controller 101 may further optimize the delay duration to obtain a more accurate delay duration. The method of optimizing the delay duration includes shortening the delay duration according to a second default interval until any one of the output voltage values does not reach its corresponding one of the target levels, and storing a previous delay duration as an optimal delay duration. It should be noted that, the controller core 1011 may simulate the action of the power-on button pushed by the user. Therefore, after the controller core 1011 shortens the delay duration according to the second default interval and updates the stored delay duration, and the controller core 1011 simulates the action of the power-on button pushed by the user. The controller core 1011 may repeat the above actions (shortening the delay duration and simulating the power-on button being pushed), until when any one of the output voltage values of the first voltage converter VCC1, the second voltage converter VCC2 and the third voltage converter VCC3 does not reach their corresponding target levels, the controller core 1011 may store the previous delay duration as the optimal delay duration to update the originally stored delay duration. The second default interval is, for example, 20 milliseconds, wherein the first default interval may be the same as the second default interval, the first default interval and the second default interval may also be different from each other, the present disclosure does not limit the actual numerical values of the first default interval and the second default interval.

For example, assuming the pre-stored delay duration is 330 milliseconds, if the first voltage converter VCC1, the second voltage converter VCC2 and the third voltage converter VCC3 all reach their corresponding target levels after 330 milliseconds (the delay duration) has passed, the controller core 1011 may shorten the delay duration from 330 milliseconds to 310 milliseconds according to the 20 milliseconds interval (the second default interval), and simulates the action of the power-on button pushed by the user to restart the computer. After the computer is restarted, if after 310 milliseconds (the delay duration), the first voltage converter VCC1, the second voltage converter VCC2 and the third voltage converter VCC3 all reach their corresponding target levels, the controller core 1011 may shorten the delay duration with the default interval again. Assuming that the output voltage value of the first voltage converter VCC1 does not reach the target level when the delay duration is shortened to 210 milliseconds, the controller core 1011 may update the delay duration with the previous delay duration, and the updated delay duration (the previous delay duration) in this case is 230 milliseconds.

Please refer to the delay modulation procedure DP and step S19. Specifically, the control device 10 may perform the delay modulation procedure DP and step S19 repeatedly to gradually modulate the delay duration. That is, after the controller 101 increases the delay duration in step S19 and updates the increased delay duration, if, for the next booting procedure, the first voltage converter VCC1, the second voltage converter VCC2 and the third voltage converter VCC3 all reach the target levels after the delay duration has passed, the delay duration increased in step S19 is the optimal delay duration. Alternatively, after the controller 101 shortens the delay duration and updates the pre-stored delay duration, if, for the next booting procedure, one of the first voltage converter VCC1, the second voltage converter VCC2 and the third voltage converter VCC3 does not reach the target level after the delay duration has passed, it means that the delay duration before the shortening is the optimal delay duration. In other words, among the three delay durations required for the output voltage values of the first voltage converter VCC1, the second voltage converter VCC2 and the third voltage converter VCC3 reaching the target levels, the longest one of the durations is the updated delay duration stored into the controller core 1011 of the controller 101.

In short, the control device 10 may increase the delay duration when the delay duration is too short, and shorten the delay duration when the delay duration is too long, thereby obtaining the optimal delay duration. The optimal delay duration is a duration, for example, from the first voltage converter VCC1, the second voltage converter VCC2 and the third voltage converter VCC3 being activated to their output voltage values just reach the target levels.

After updating the stored delay duration, if the controller 101 is triggered by the delay duration modulation command (for example, the power-on signal) again, the controller core 1011 may output the power good signal to the central processing unit 102 after the delay duration has passed, for the central processing unit 102 to perform the booting procedure. At this time, the output voltages of the first voltage converter VCC1, the second voltage converter VCC2 and the third voltage converter VCC3 all reach their corresponding target levels. Accordingly, when any one of the first voltage converter VCC1, the second voltage converter VCC2 and the third voltage converter VCC3 needs more time to reach the target level due to degradation or any other reasons, the computer may still be booted and function by adjusting the delay duration without replacing hardware components.

Figure 3:
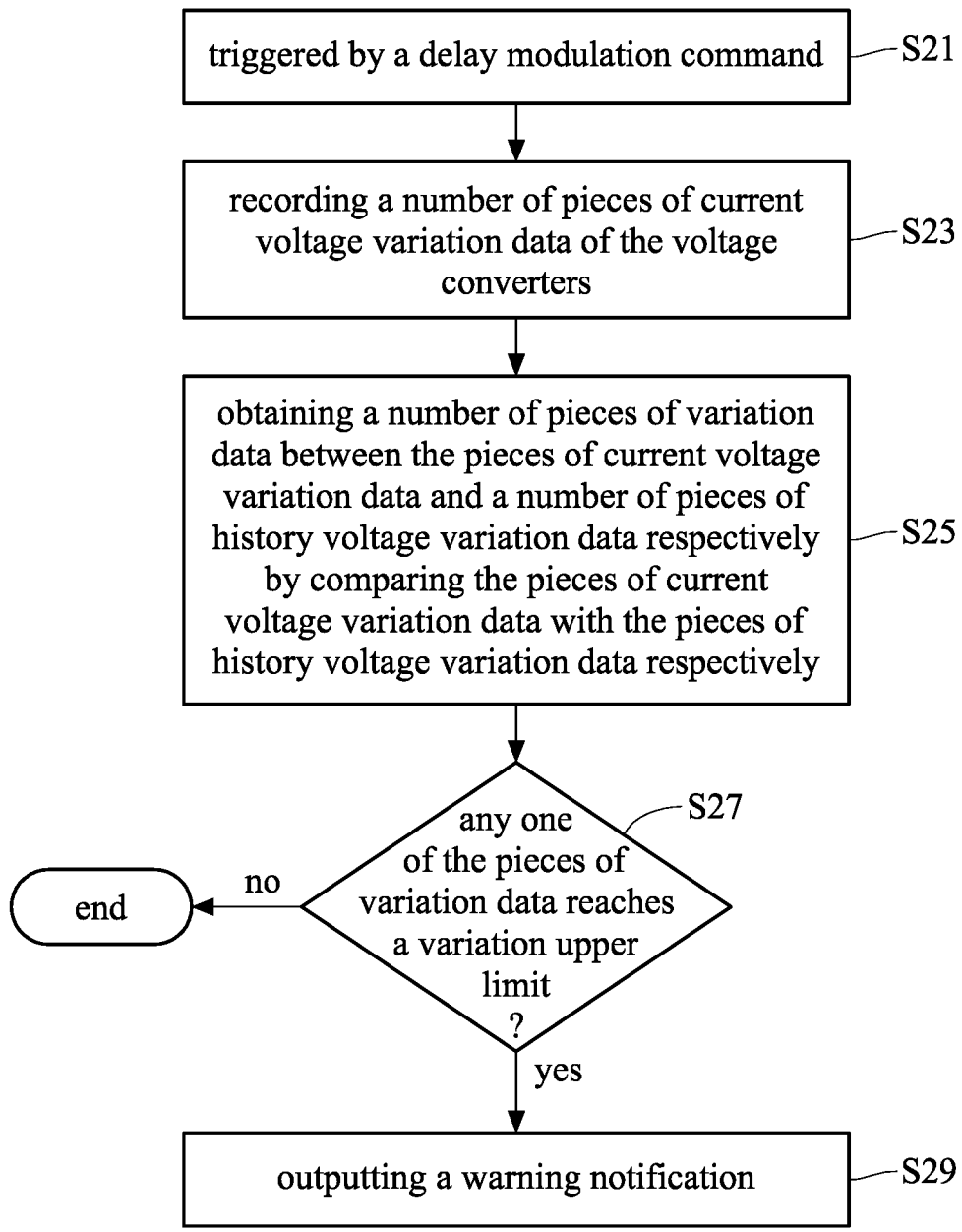
FIG. 3 is a flowchart illustrating control method for powering timing according to another embodiment of the present disclosure.

In another embodiment, in addition to steps S13, S15, S17 and S19, the control method for powering timing further includes performing a monitoring procedure using the controller 101. Please refer to FIG. 1 and FIG. 3, wherein FIG. 3 is a flowchart illustrating a monitoring procedure of the control method for powering timing according to another embodiment of the present disclosure. The monitoring procedure includes steps S21, S23 S25, S27 and S29. The embodiment of FIG. 3 may also include steps S13, S15, S17 and S19 of FIG. 2, wherein steps S13, S15, S17 and S19 may be performed after step S21 of FIG. 2, and step S13 of FIG. 2 may be performed in parallel with step S23 of FIG. 3. The present disclosure does not limit the sequence of performing steps S15, S17 and S19 of FIG. 2 and steps S25, S27 and S29 of FIG. 3.

In step S21, the controller 101 is triggered by the delay duration modulation command (for example, the power-on signal). In step S23, the controller core 1011 may record a number of pieces of current voltage variation data of the first voltage converter VCC1, the second voltage converter VCC2 and the third voltage converter VCC3. The current voltage variation data may indicate a number of current delay durations of a number of current output voltage values of the first voltage converter VCC1, the second voltage converter VCC2 and the third voltage converter VCC3 outputting power to the first component A, the second component B and the third component C respectively reaching the target levels. The controller core 1011 may record the change of the current output voltage value of each voltage converter with respect to time (in the form of a voltage variation curve) to record the current delay duration required for the current output voltage value to reach the target level, or directly record the current delay duration required for the current output voltage value of each voltage converter to reach the target level.

Then, in step S25, the controller core 1011 compares the pieces of current voltage variation data of the first voltage converter VCC1, the second voltage converter VCC2 and the third voltage converter VCC3 with a number of pieces of corresponding history voltage variation data, to obtain a number of pieces of variation data between the pieces of current voltage variation data and the pieces of history voltage variation data respectively. Specifically, in step S25, the controller core 1011 may define the pieces of variation data as the current delay durations of the current output voltage values of the converters VCC1-VCC3 reaching the target levels, and define the pieces of history voltage variation data as history delay durations of a number of history output voltage values of the converters VCC1-VCC3 reaching the target levels, and use the differences between the current delay durations and the corresponding history delay durations as the pieces of variation data.

Take the first voltage converter VCC1 as an example, the controller core 1011 may record a time difference between the duration required for the current output voltage value of the first voltage converter VCC1 reaching the target level and the duration required for the history output voltage value of the first voltage converter VCC1 reaching the target level. This time difference may be used as the variation data of the first voltage converter VCC1, and be recorded into the controller core 1011.

After obtaining the pieces of variation data of the first voltage converter VCC1, the second voltage converter VCC2 and the third voltage converter VCC, in step S27, the controller core 1011 determines whether any one of the pieces of variation data reaches a variation upper limit, wherein the variation upper limit is the maximum allowable time difference between the current delay duration required for the current output voltage value to reach the target level and the corresponding history delay duration. Therefore, if the controller core 1011 determines that none of the pieces of variation data reach the variation upper limit, the controller core 1011 may end the monitoring procedure; and if the controller core 1011 determines that one of the pieces of variation data reaches the variation upper limit, the controller core 1011 outputs a warning notification in step S29.

For example, assuming the variation upper limit is 50 milliseconds, the current delay duration of the first voltage converter VCC1 is 500 milliseconds, the history delay duration is 200 milliseconds, and the variation data is 300 milliseconds, then the controller core 1011 determines that the variation data of 300 milliseconds is greater than the variation upper limit of 50 milliseconds, and may output the warning notification associated with the first voltage converter VCC1 to a user interface (for example, LED indicator, display or buzzer), to notify the user that the first voltage converter VCC1 may be malfunctioned.

Accordingly, the output voltage value of each voltage converter may be made sure to reach the target level, and the booting procedure is performed when the output voltage value of each voltage converter reaches the target level. In addition, in the event of a voltage converter failure, the user may also quickly determine which voltage converter has a failure problem, so as to perform corresponding treatment.

In view of the above description, the control method and device for powering timing according to one or more embodiments of the present disclosure may allow a computer to boot and operate normally without replacing the component by adjusting the delay duration even if one of the component in the computer deteriorates and requires longer delay duration. In addition, the control method and device for powering timing according to one or more embodiments of the present disclosure may be used to make sure that the output voltage value of each voltage converter to reach the target level, and the booting procedure is performed when the output voltage value of each voltage converter reaches the target level. Moreover, even if there is a voltage converter failure, the user may also quickly determine which voltage converter has the failure problem, so as to perform corresponding treatment.

What is claimed is:

1. A control method for powering timing, performed by a controller, comprising:
   performing a delay modulation procedure when triggered by a delay modulation command, wherein the delay modulation procedure comprises:
      after a delay duration has passed, determining whether a plurality of output voltage values of a plurality of voltage converters reach a plurality of target levels respectively, wherein the target levels correspond to the output voltage values respectively;
   if any one of the output voltage values does not reach a corresponding one of the target levels, increasing the delay duration according to a first default interval and updating the delay duration, and performing the delay modulation procedure when triggered by the delay modulation command again; and if the output voltage values reach the target levels respectively, outputting a power good signal to a central processing unit, for the central processing unit to perform a booting procedure.

2. The control method for powering timing according to claim 1, wherein determining whether the output voltage values of the voltage converters reach the target levels respectively comprises:
converting a plurality of analog voltages of the voltage converters into a plurality of digital voltages respectively, and using voltage values of the digital voltages as the output voltage values.

3. The control method for powering timing according to claim 1, further comprising:
if the output voltage values reach the target levels respectively, shortening the delay duration according to a second default interval until any one of the output voltage values does not reach its corresponding one of the target levels, and storing a previous delay duration as an optimal delay duration.

4. The control method for powering timing according to claim 1, further comprising, after triggered by the delay modulation command, performing:
recording a plurality of pieces of current voltage variation data of the voltage converters;
obtaining a plurality of pieces of variation data between the pieces of current voltage variation data and a plurality of pieces of history voltage variation data respectively by comparing the pieces of current voltage variation data with the pieces of history voltage variation data respectively;
determining whether any one of the pieces of variation data reaches a variation upper limit; and
outputting a warning notification when any one of the pieces of variation data reaches the variation upper limit.

5. The control method for powering timing according to claim 4, wherein obtaining the pieces of variation data between the pieces of current voltage variation data and the pieces of history voltage variation data comprises:
defining the pieces of current voltage variation data as indicating a plurality of current delay durations of a plurality of current output voltage values of the voltage converters reaching the target levels respectively;
defining the pieces of history voltage variation data as indicating a plurality of history delay durations of a plurality of history output voltage values of the voltage converters reaching the target levels respectively; and
using differences between the current delay durations and the history delay durations as the pieces of variation data.

6. A control device for powering timing, comprising:
a central processing unit electrically connected to a plurality of voltage converters, with the central processing unit configured to perform a booting procedure when receiving a power good signal; and
a controller electrically connected to the central processing unit and the voltage converters;
wherein the controller is configured to perform:
a delay modulation procedure when triggered by a delay modulation command, and the delay modulation procedure comprising:
after a delay duration has passed, determining whether a plurality of output voltage values of the voltage converters reach a plurality of target levels respectively, wherein the target levels correspond to the output voltage values respectively;
if any one of the output voltage values does not reach a corresponding one of the target levels, increasing the delay duration according to a first default interval and updating the delay duration, and performing the delay modulation procedure when triggered by the delay modulation command again; and
if the output voltage values reach the target levels respectively, outputting the power good signal to the central processing unit.

7. The control device for powering timing according to claim 6, wherein,
if the output voltage values reach the target levels respectively, the controller is configured to shorten the delay duration according to a second default interval until any one of the output voltage values does not reach its corresponding one of the target levels, and stores a previous delay duration as an optimal delay duration.

8. The control device for powering timing according to claim 6, wherein the controller comprises at least one analog-to-digital converter connected to the voltage converters, and the at least one analog-to-digital converter is configured to receive a plurality of analog voltages outputted by the voltage converters, convert the analog voltages into a plurality of digital voltages respectively, and use voltage values of the digital voltages as the output voltage values.

9. The control device for powering timing according to claim 6, wherein after triggered by the delay modulation command, the controller is further configured to record a plurality of pieces of current voltage variation data of the voltage converters, obtain a plurality of pieces of variation data between the pieces of current voltage variation data and a plurality of pieces of history voltage variation data respectively by comparing the pieces of current voltage variation data with the pieces of history voltage variation data respectively, determine whether any one of the pieces of variation data reaches a variation upper limit, and output a warning notification when any one of the pieces of variation data reaches the variation upper limit.

10. The control device for powering timing according to claim 9, wherein the pieces of current voltage variation data indicate a plurality of current delay durations of a plurality of current output voltage values of the voltage converters reaching the target levels respectively, the pieces of history voltage variation data as indicate a plurality of history delay durations of a plurality of history output voltage values of the voltage converters reaching the target levels respectively, and the pieces of variation data are differences between the current delay durations and the history delay durations.

* * * * *

UNITED STATES PATENT AND TRADEMARK OFFICE
CERTIFICATE OF CORRECTION

PATENT NO. : 12,026,519 B2
APPLICATION NO. : 18/070320
DATED : July 2, 2024
INVENTOR(S) : Chin Jun Kao It is certified that error appears in the above-identified patent and that said Letters Patent is hereby corrected as shown below:

On the Title Page

Column 1, insert Item (30):
--Foreign Application Priority Data
Dec. 29, 2021 (TW) ............................110149261--

Signed and Sealed this
Third Day of September, 2024

Katherine Kelly Vidal
*Director of the United States Patent and Trademark Office*